United States Patent
Kobori (10) Patent No.: US 10,081,401 B2
(45) Date of Patent: Sep. 25, 2018

(54) CRAWLER TRACK SHOE CORE METAL, RESILIENT CRAWLER TRACK SHOE, AND CRAWLER TRACK SHOE CORE METAL MANUFACTURING METHOD

(71) Applicant: BRIDGESTONE CORPORATION, Chuo-ku, Tokyo (JP)

(72) Inventor: Tatsuya Kobori, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 58 days.

(21) Appl. No.: 15/294,794

(22) Filed: Oct. 17, 2016

(65) Prior Publication Data
US 2017/0113744 A1    Apr. 27, 2017

(30) Foreign Application Priority Data
Oct. 26, 2015 (JP) .................................. 2015-210252

(51) Int. Cl.
*B62D 55/28* (2006.01)
*B21D 28/32* (2006.01)

(52) U.S. Cl.
CPC .............. *B62D 55/28* (2013.01); *B21D 28/32* (2013.01)

(58) Field of Classification Search
CPC ...... B62D 55/24; B62D 55/244; B62D 55/26; B62D 55/28; B62D 55/275
See application file for complete search history.

(56) References Cited

U.S. PATENT DOCUMENTS

| | | | | |
|---|---|---|---|---|
| 5,800,026 A * | 9/1998 | Nagata | ............... | B62D 55/275 305/189 |
| 6,460,945 B2 * | 10/2002 | Takeno | ............... | B62D 55/20 305/165 |
| 6,533,371 B2 * | 3/2003 | Hori | ............... | B62D 55/275 305/111 |
| 6,568,769 B1 * | 5/2003 | Watanabe | ............ | B62D 55/244 305/171 |

(Continued)

FOREIGN PATENT DOCUMENTS

| JP | S48-070325 U | 9/1973 |
|---|---|---|
| JP | S50-105530 A | 8/1975 |
| JP | S59-030786 U | 2/1984 |

(Continued)

OTHER PUBLICATIONS

Extended European Search Report dated Mar. 8, 2017, from the EPO in an European patent application corresponding to the instant patent application.

*Primary Examiner* — Kip T Kotter
(74) *Attorney, Agent, or Firm* — Solaris Intellectual Property Group, PLLC (57) ABSTRACT

A crawler track shoe core metal is plate shaped and is clamped and fixed by a fixing member to a moving link provided at a travelling body. The crawler track shoe core metal includes a cutout portion, a through-hole, and a raised portion. The cutout portion is formed indented in a face at the moving link side. The through-hole pierces through inside the cutout portion in a plate thickness direction and is inserted with the fixing member. The raised portion projects out from a through-hole peripheral edge of the cutout portion toward the moving link side, and has a projecting end with a height that does not reach the face at the moving link side.

3 Claims, 7 Drawing Sheets

(56) References Cited

U.S. PATENT DOCUMENTS 6,913,330 B2 * 7/2005 Takeno .................. B62D 55/20
                                                                                      305/165

FOREIGN PATENT DOCUMENTS

| JP | H09-249161 A | | 9/1997 | |
|----|--------------|---|--------|---|
| JP | 2002104258 A | * | 4/2002 | ............. B62D 55/26 |
| JP | 2005-047416 A | | 2/2005 | |

* cited by examiner

FIG.2 ic # CRAWLER TRACK SHOE CORE METAL, RESILIENT CRAWLER TRACK SHOE, AND CRAWLER TRACK SHOE CORE METAL MANUFACTURING METHOD

CROSS-REFERENCE TO RELATED APPLICATION

This application claims priority under 35 USC 119 from Japanese Patent Application No. 2015-210252 filed Oct. 26, 2015, the disclosure of which is incorporated by reference herein.

BACKGROUND

Technical Field

The present invention relates to a crawler track shoe core metal and a manufacturing method thereof, as well as a resilient crawler track shoe employing a crawler track shoe core metal.

Related Art

Japanese Patent Application Laid-Open (JP-A) No. H09-249161 describes a rubber crawler track shoe in which bolts are fastened to a moving link (a crawler track) of a machine body of a machine used in construction, a machine used in civil engineering work, or the like. The rubber crawler track shoe is configured by vulcanization bonding a rubber material to a core metal. Through-holes for inserting the bolts are formed in a central region of the core metal.

JP-A No. S50-105530 describes a processing method in which, while machining a forged product including through-holes, indentations are provided in a back face at specific positions where the holes are to be provided, and the indentations are punched through from the opposite side by a punching mold with a pointed leading end, thereby eliminating burrs protruding out in the punching direction.

SUMMARY

It would be conceivable to employ the technology described in JP-A No. S50-105530 to form through-holes without raised portions (burrs) when manufacturing the rubber crawler track shoe core metal described in JP-A No. H09-249161.

However, in the technology described in JP-A No. S50-105530, the size of the through-holes is equivalent to that of the indentations provided at the back face and punching is performed such that the indentations do not remain, such that the positions of the indentations and the punching positions of the through-holes need to be accurately aligned. When there is a large positional misalignment, there is a possibility that the raised portions are formed projecting out from edge portions of the through holes at the back face side. Performing chamfering in order to remove the raised portions increases the number of processes and the cost.

An object of an exemplary embodiment of the present invention is to render chamfering in order to remove a raised portion formed on an edge portion of a through-hole unnecessary, so as to reduce the number of processes and the cost.

A crawler track shoe core metal according to a first aspect is formed in a plate shape, and is clamped and fixed by a fixing member to a moving link provided at a travelling body. The crawler track shoe core metal includes: a cutout portion that is formed indented in a face on a moving link side; a through-hole that pierces through inside the cutout portion in a plate thickness direction for receiving the fixing member; and a raised portion that projects out from a through-hole peripheral edge of the cutout portion toward the moving link side, the raised portion having a projecting end with a height that does not reach the face on the moving link side.

The crawler track shoe core metal includes the cutout portion formed indented in the face on the moving link side, the through-hole provided piercing through the inside of the cutout portion in the plate thickness direction, and the raised portion that projects out from the through-hole peripheral edge of the cutout portion toward the face on the moving link side. The projecting end of the raised portion has a height that does not reach the face on the moving link side. Even though the raised portion is present at the through-hole peripheral edge, this does not cause problems when attaching to the moving link as long as the raised portion does not project out from the face on the moving link side. Thus, chamfering to remove the raised portion formed at the through-hole peripheral edge is rendered unnecessary, enabling the number of processes and the cost to be reduced.

A crawler track shoe core metal according to a second aspect is the crawler track shoe core metal according to the first aspect, wherein a surface roughness of a face on a fixing member side is lower than a surface roughness of the face on the moving link side.

In the crawler track shoe core metal, the surface roughness of the face on the fixing member side is lower than the surface roughness of the face on the moving link side. This enables the surface pressure of the fixing member abutting the face on the fixing member side to be suppressed from increasing more than necessary when the crawler track shoe core metal has been clamped by the moving link and the fixing member. This enables a clamped state of the crawler track shoe core metal to be stabilized.

A resilient crawler track shoe according to a third aspect includes the crawler track shoe core metal of claim 1 having a face on a fixing member side covered by a resilient body.

The face on the fixing member side of the crawler track shoe core metal is the face on the ground contact side. In the resilient crawler track shoe, the face on the fixing member side, namely, the face on the ground contact side of the crawler track shoe core metal, is covered by the resilient body. This enables the occurrence of vibration when the machine body is travelling to be reduced, and damage to a road surface on which it is travelling to be suppressed.

A crawler track shoe core metal manufacturing method according to a fourth aspect includes: an indentation forming process of forming an indentation in a part of a face on one side in a plate thickness direction of a heated plate-shaped body; and a punching process of punching a location aligned within a range of the indentation, from another side in the plate thickness direction of the plate-shaped body, using a press to form a through-hole.

In the crawler track shoe core metal manufacturing method, the indentation is formed in the face on the one side in the plate thickness direction of the heated plate shaped body in the indentation forming process. Next, the location aligned within the range of the indentation is punched from the other side in the plate thickness direction of the plate shaped body using a press to form the through-hole in the punching process. A peripheral edge on the one side of the through-hole is positioned inside the range of the indentation when this is performed. Thus, even if a raised portion is formed at a peripheral edge positioned on an exit side of the punching, the raised portion is formed within the range of the indentation, and so is suppressed from projecting out from the face on the one side in the plate thickness direction. Thus, chamfering to remove the raised portion formed at the through-hole peripheral edge is rendered unnecessary, enabling the number of processes and the cost to be reduced.

A crawler track shoe core metal manufacturing method according to a fifth aspect is the crawler track shoe core metal manufacturing method according to the fourth aspect further includes a surface treatment process of reducing a height of a raised portion formed at a through-hole peripheral edge in the punching process, such that the raised portion does not project out from the face on the one side.

In this crawler track shoe core metal manufacturing method, the raised portion formed at the through-hole peripheral edge is reduced in a blasting process, thereby enabling the raised portion to be further suppressed from projecting out toward the one side in the plate thickness direction. This also enables scale and so on, which has adhered to the face on the one side in the previous processes, to be removed.

An exemplary embodiment of the present invention obtains an excellent advantageous effect of enabling chamfering to remove the raised portion formed on the through-hole peripheral edge to be rendered unnecessary, reducing the number of processes and the cost.

BRIEF DESCRIPTION OF THE DRAWINGS

Exemplary embodiments of one embodiment will be described in detail based on the following figures, wherein.

DETAILED DESCRIPTION

Explanation follows regarding an exemplary embodiment of technology of the present disclosure, based on the drawings.

Crawler Track Shoe Core Metal

Figure 1:
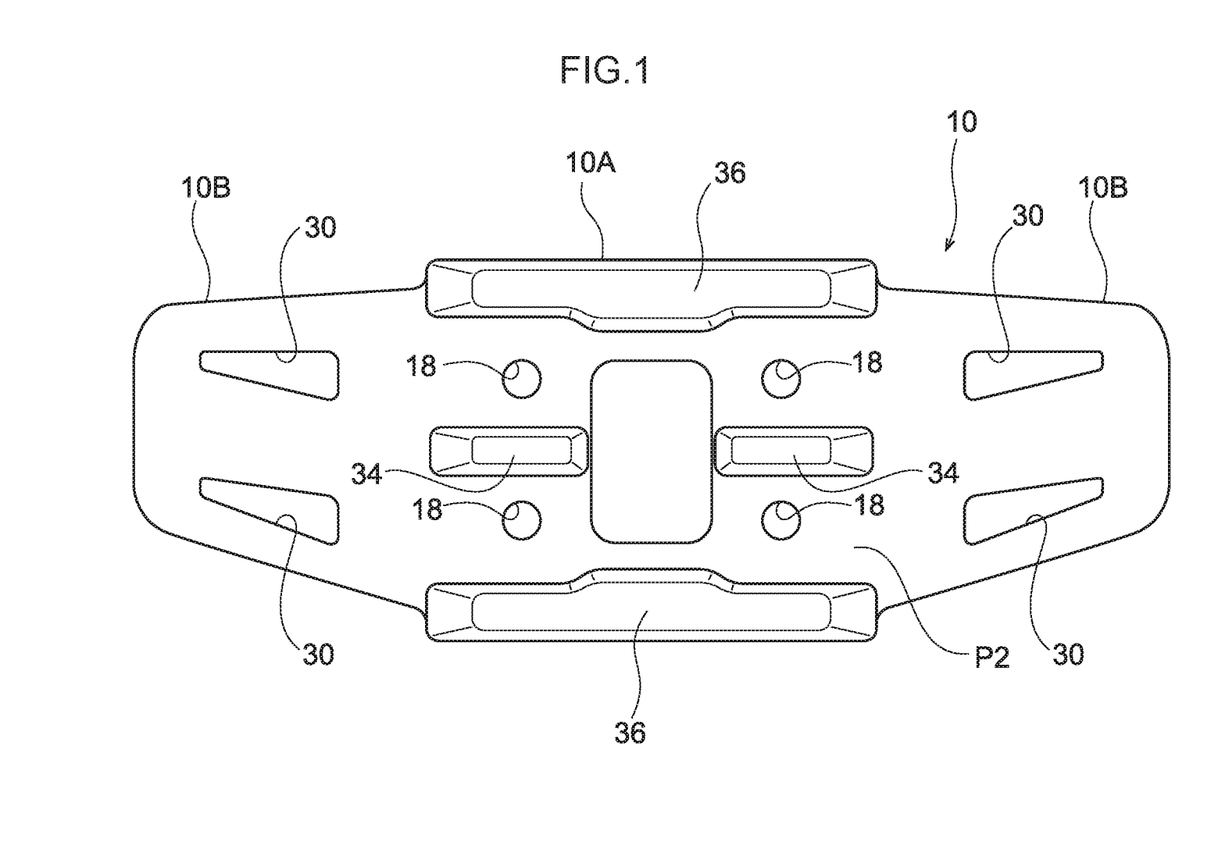
FIG. 1 is a plan view illustrating a face on one side in a plate thickness direction of a crawler track shoe core metal according to an exemplary embodiment.
Figure 3:
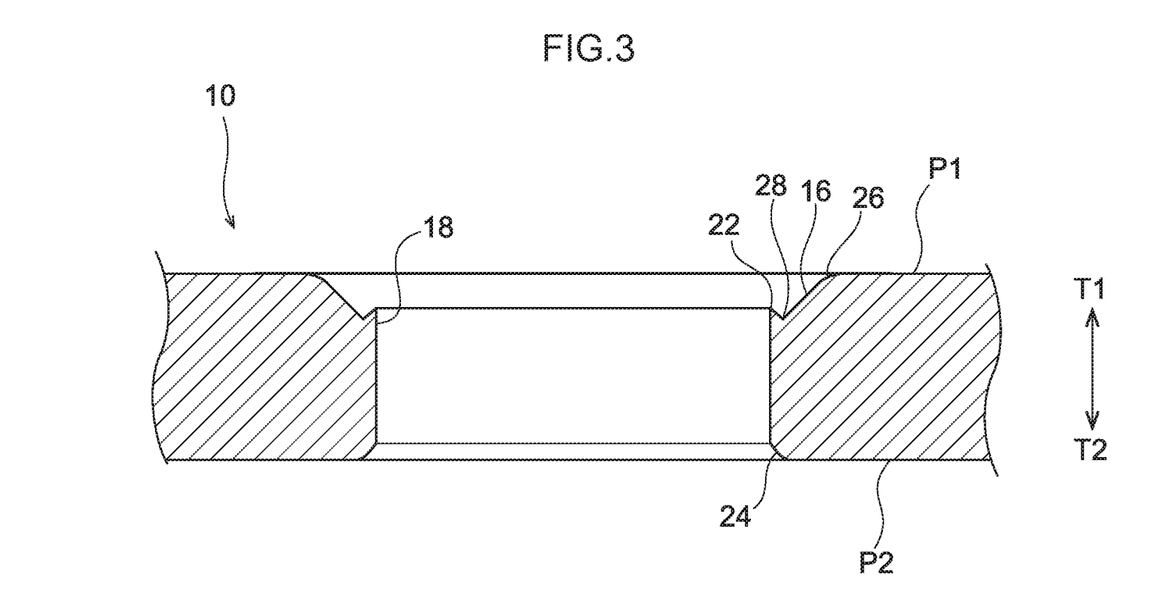
FIG. 3 is an enlarged cross-section along arrow 3-3 in FIG. 2, illustrating a through-hole.
Figure 4:
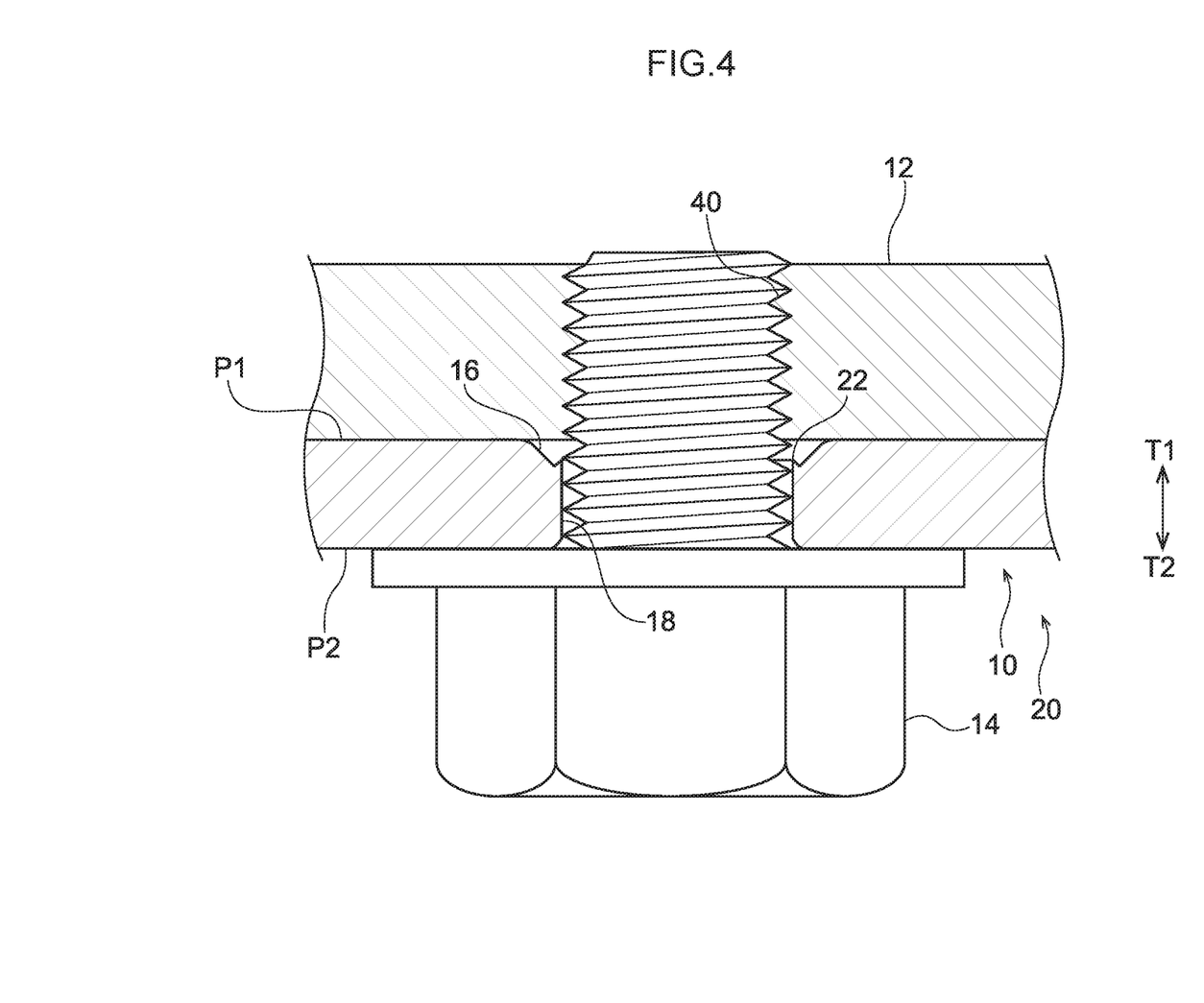
FIG. 4 is an enlarged cross-section illustrating a state in which a resilient crawler track shoe according to an exemplary embodiment has been clamped by a moving link and a bolt.
Figure 5:
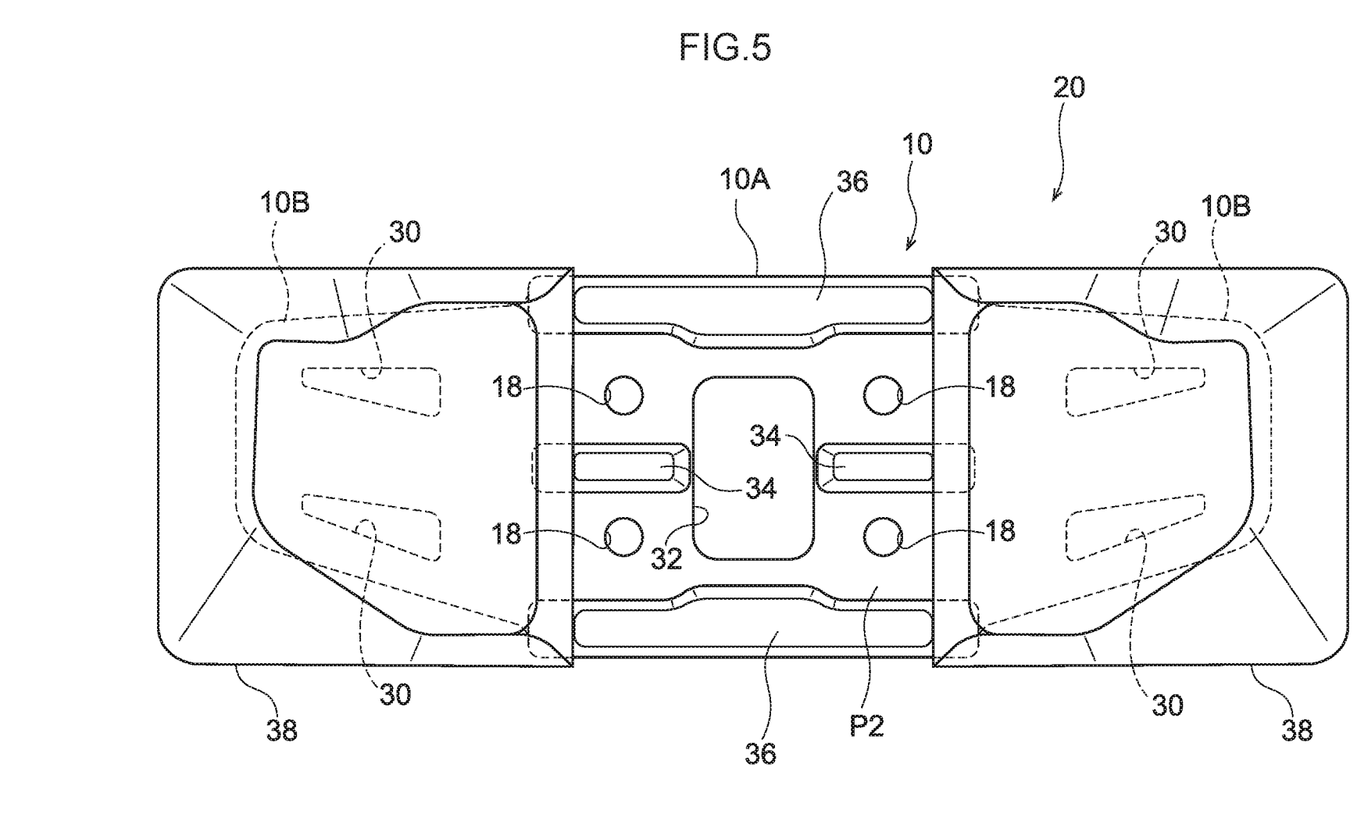
FIG. 5 is a plan view corresponding to FIG. 2, illustrating a resilient crawler track shoe according to an exemplary embodiment.

A crawler track shoe core metal 10 according to technology of the present disclosure as illustrated in FIG. 1 is a frame member of a resilient crawler track shoe 20, as illustrated in FIG. 5 as an example. Note that, for ease of explanation, the crawler track shoe core metal 10 is sometimes simply referred below to as "core metal 10". The core metal 10 is plate shaped, and as illustrated in FIG. 4 as an example, is clamped and fixed to a moving link 12 by bolts 14, these being examples of a fixing member. The moving link 12 is a crawler track provided at a machine body. When the resilient crawler track shoe 20 is attached to the moving link 12, the moving link 12 abuts a moving link side face P1, this being a face on one side in a plate thickness direction of the core metal 10. Namely, the moving link side face P1 is an attachment face of the core metal 10 to the moving link 12. When the resilient crawler track shoe 20 is attached to the moving link 12, the bolts 14 abut a bolt side face P2, this being a face at another side in the plate thickness direction of the core metal 10. In FIG. 3 and FIG. 4, a moving link side, namely, the one side in the plate thickness direction, corresponds to the arrow T1 direction, and the bolt side, namely, the other side in the plate thickness direction, corresponds to the arrow T2 direction. The core metal 10 includes cutout portions 16, through-holes 18, and raised portions 22.

The cutout portion 16 illustrated in FIG. 3 is formed by indenting the moving link side face P1. The cutout portion 16 is a circular conical shaped indented face angled at substantially 45° with respect to the plate thickness direction of the respective through-hole 18, for example. A boundary portion of the cutout portion 16 with the moving link side face P1 forms a rounded face portion 26 with a circular arc shaped cross-section. The depth of the cutout portion 16 is deeper than the depth of a chamfered portion 24. Note that the shape of the cutout portion 16 is not limited to being a circular conical shaped indented face, and may be an indented face with a stepped shape or a circular arc shaped cross-section, for example, or may be another shape.

Figure 2:
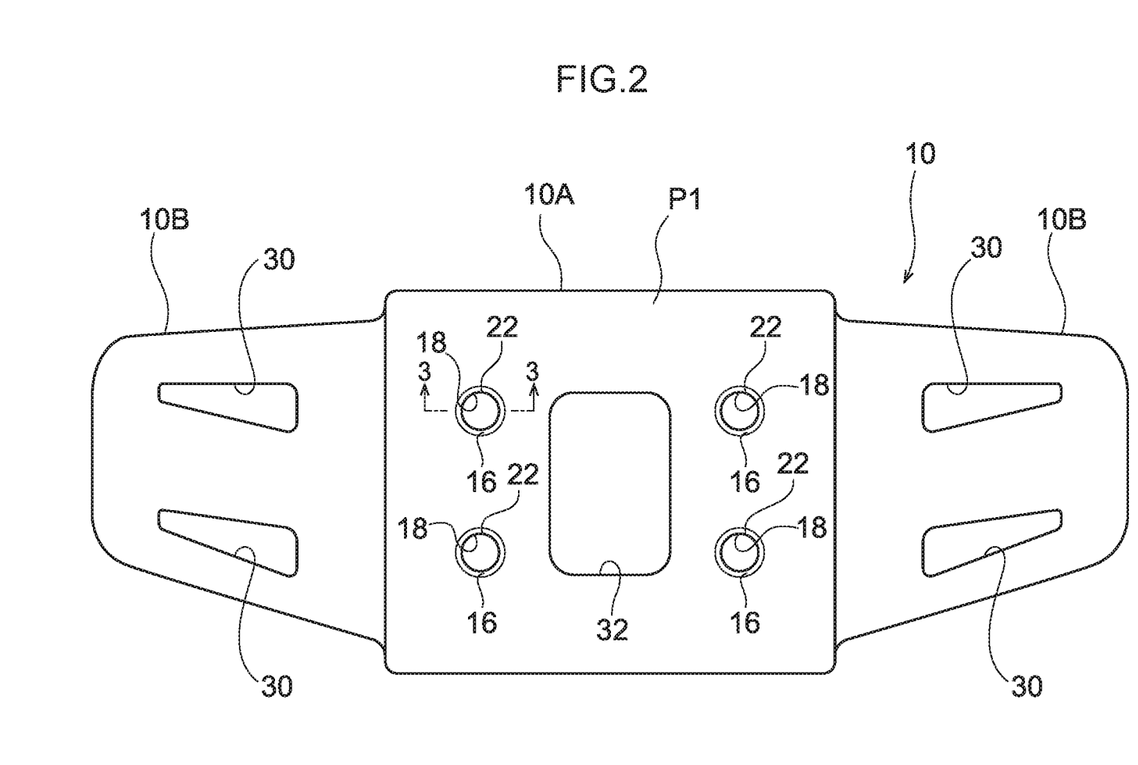
FIG. 2 is a plan view illustrating a face on another side in a plate thickness direction of a crawler track shoe core metal according to an exemplary embodiment.

In FIG. 1 to FIG. 3, each through-hole 18 is an attachment hole that passes inside the respective cutout portion 16 and pierces through the plate thickness direction of the core metal 10, for receiving the bolt 14 illustrated in FIG. 4 as an example. The through-holes 18 are formed at four locations, for example, in a center portion 10A in a length direction of the core metal 10. The diameter of each through-hole 18 is set as appropriate corresponding to a nominal diameter of the bolt 14. The through-holes 18 are punched by, for example, a press. The chamfered portion 24 that is angled at substantially 45° with respect to the plate thickness direction of the respective through-hole 18 is formed at another side peripheral edge of the through-hole 18.

Each raised portion 22 is a location that projects out from a through-hole peripheral edge of the cutout portion 16 toward the moving link side, namely, toward the arrow T1 side. A projecting end of the raised portion 22 has a height that does not reach the respective moving link side face P1. In other words, the raised portion 22 is a location that does not project out from the moving link side face P1. The raised portion 22 corresponds to a burr formed when forming the respective through-hole 18, for example. A trough portion 28 is formed at a boundary between each raised portion 22 and the respective cutout portion 16. The raised portion 22 has an acute angle shaped cross-section profile, but a leading end is preferably rounded.

A surface roughness of the bolt side face P2 is less than a surface roughness of the moving link side face P1, and the bolt side face P2 is smoother than the moving link side face P1. The bolt side face P2 is a seating face abutted by the bolts 14, and making this face smooth enables looseness of the bolts 14 to be suppressed and a clamped state of the core metal 10 to be stabilized.

The core metal 10 includes two end portions 10B, at either side of the center portion 10A in the length direction of the core metal 10. The two end portions 10B are locations that are not in contact with the moving link 12. Two through-holes 30 are formed in each of the two end portions 10B. These through-holes 30 each have an elongated shape, for example, and are formed arrayed in the width direction of the core metal 10, namely, the short direction of the core metal 10.

As illustrated in FIG. 2 as an example, a rectangular shaped through-hole 32, for example, is formed in the center portion 10A of the core metal 10 in order to reduce weight. Ribs 34, 36 are also integrally provided extending along the length direction of the core metal 10 on the bolt side face P2 of the center portion 10A. A main object of the ribs 34, 36 is to protect a head portion of each bolt 14, illustrated in FIG. 4 as an example; however, the ribs 34, 36 also contribute to improving the strength of the core metal 10. The core metal 10 can be thinned and accordingly made lighter in weight by providing the ribs 34, 36.

Note that the shapes of these narrowed portions of the core metal 10 are merely examples and may be changed as desired.

Resilient Crawler Track Shoe

In the resilient crawler track shoe 20 in FIG. 5, the bolt side face P2 of the core metal 10 is covered by rubber 38, as an example of a resilient body. Specifically, mainly the two end portions 10B of the core metal 10 are covered by the rubber 38. The periphery of the through-holes 18 in the bolt side face P2 are not covered by the rubber 38. The rubber 38 is vulcanization bonded to the core metal 10, for example. Portions of the rubber 38 that cover the bolt side face P2 are ground contact portions that run over a non-illustrated road surface. Namely, the resilient body is a ground contact member.

As illustrated in FIG. 4 as an example, the resilient crawler track shoe 20 is fastened and fixed to the moving link 12 using the bolts 14. This achieves a clamped state of the resilient crawler track shoe 20 between the moving link 12 and the bolts 14. Female screws 40 that are screwed together with the respective bolts 14 are formed in the moving link 12 in order to fasten the bolts. Note that non-illustrated nuts may be provided at the moving link 12 and the bolts 14 fastened to these nuts. Moreover, a configuration may be provided in which stud bolts project out from the moving link 12 and these stud bolts are passed through the through-holes 18 and fastened thereto by non-illustrated nuts. Namely, the fixing member is not limited to the bolts 14, and may be members such as nuts.

Operations

Explanation follows regarding operations according to technology of the present disclosure configured as described above. In FIG. 2 to FIG. 4, the cutout portions 16 are formed indented in the moving link side face P1 of the core metal 10 according to technology of the present disclosure, and the through-holes 18 are provided piercing through inside the respective cutout portions 16 in the plate thickness direction. The raised portions 22 that project out from the through-hole peripheral edges of the respective cutout portions 16 toward the moving link side face P1 are also provided. The projecting end of each raised portion 22 has a height that does not reach the moving link side face P1. Even though the raised portions 22 are present at the respective through-hole peripheral edges, interference between the raised portions 22 and the moving link 12 is suppressed as long as the raised portions 22 do not project out from the moving link side face P1, so there is no issue with respect to attachment to the moving link 12. Thus, chamfering to remove the raised portions 22 formed at the respective through-hole peripheral edges is rendered unnecessary, enabling the number of processes and the cost to be reduced.

In the core metal 10, the surface roughness of the bolt side face P2 is lower than the surface roughness of the moving link side face P1, and the bolt side face P2 is smoother than the moving link side face P1. This enables the surface pressure of the bolts 14 abutting the other side face P2 to be suppressed from increasing more than necessary when the core metal 10 has been clamped by the moving link 12 and the bolts 14. This enables the clamped state of the core metal 10 to be stabilized.

As illustrated in FIG. 4 as an example, the bolt side face P2 of the core metal 10 is a ground contact side face. The cutout portions 16 are provided in the moving link side face P1, so there is no reduction in the seating face of the bolts 14. Thus, the surface pressure of locations of the bolt side face P2 that forms the seating face of the bolts 14 is not increased more than necessary when fastening the bolts 14.

In the resilient crawler track shoe 20 provided with the rubber 38 in FIG. 5, the bolt side face P2 of the core metal 10, namely, the ground contact side face, is covered by the rubber 38, thereby enabling the occurrence of vibration when the machine body is travelling to be reduced, and damage to the road surface over which it is travelling to be suppressed.

Crawler Track Shoe Manufacturing Method

Figure 6A:
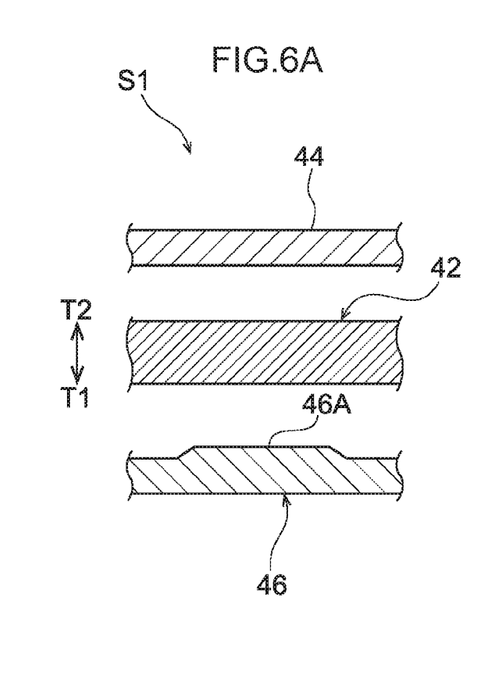
FIG. 6A is a cross-section illustrating a plate shaped body, an upper mold, and a lower mold.
Figure 6B:
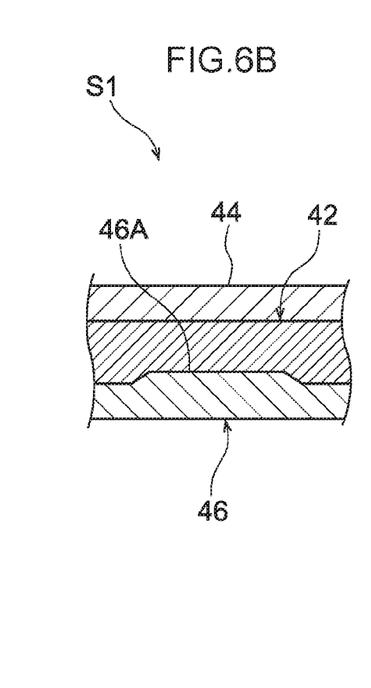
FIG. 6B is a cross-section illustrating an indentation forming method in which a plate shaped body is pressed by an upper mold and a lower mold to form an indentation.
Figure 6C:
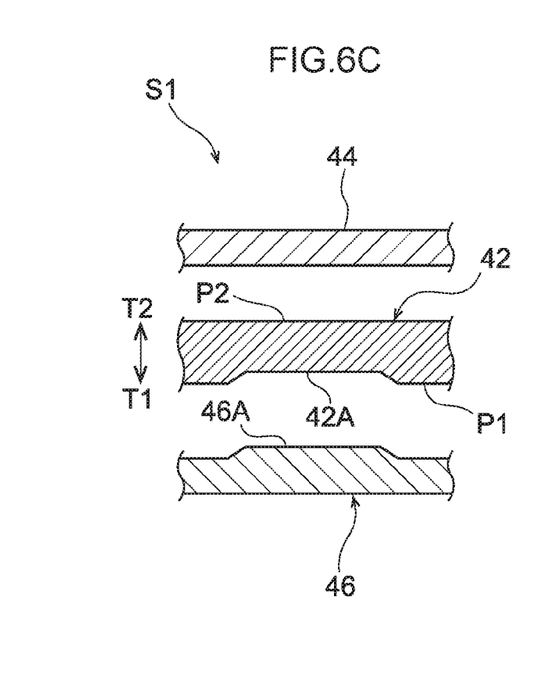
FIG. 6C is a cross-section illustrating a state in which an upper mold and a lower mold have been separated from a plate shaped body formed with an indentation.

In FIGS. 6 and FIGS. 7, a crawler track shoe core metal manufacturing method according to technology of the present disclosure includes an indentation forming process 51, a punching process S2, and a blasting process S3 as an example of a surface treatment process.

The indentation forming process 51 is a process in which indentations 42A are formed in parts of a face on one side in a plate thickness direction of a heated plate shaped body 42. Note that the face on one side in the plate thickness direction corresponds to the moving link side face P1 of the core metal 10, and a face on another side in the plate thickness direction corresponds to the bolt side face P2 of the core metal 10.

Specifically, as illustrated in FIG. 6A as an example, first, the heated plate shaped body 42 is disposed between an upper mold 44 and a lower mold 46 including protrusions 46A. As an example, the plate shaped body 42 is the material of the core metal 10 illustrated in FIG. 1. The protrusions 46A are disposed facing the face on the one side in the plate thickness direction of the plate shaped body 42, namely, the moving link side face P1. The shape of each protrusion 46A is set corresponding to the shape of the respective indentation 42A. In the technology of the present disclosure, this is a circular truncated cone shape, for example. Next, as illustrated in FIG. 6B, the plate shaped body 42 is sandwiched between the upper mold 44 and the lower mold 46 and hot forged. Then, as illustrated in FIG. 6C, the plate shaped body 42 formed with the indentations 42A corresponding to the shapes of the protrusions 46A is obtained by separating the upper mold 44 and the lower mold 46. The plate shaped body 42 is machined by forging so as to have the outer profile of the core metal 10.

When forging, a face on one side, namely, the moving link side face P1, contacts the lower mold 46, and a face on another side, namely, the bolt side face P2, contacts the upper mold 44. The face on the one side, namely, the moving link side face P1, has a tendency to have a high surface roughness due to adhesion of scale, this being an oxidized layer. In contrast thereto, the face on the other side, namely, the bolt side face P2, has less adhesion of scale and a lower surface roughness than the face on the one side, namely, the moving link side face P1. Thus, the surface roughness of the face on the other side, namely, the bolt side face P2, is lower than the surface roughness of the face on the one side, namely, the moving link side face P1.

Figure 7A:
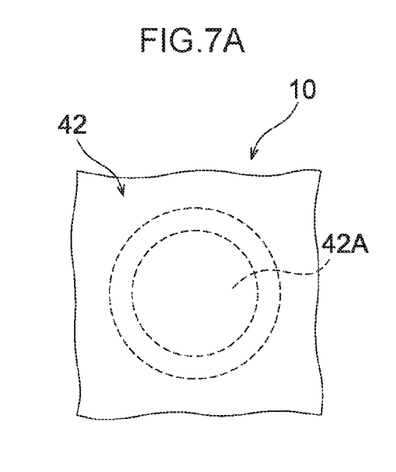
FIG. 7A is a plan view illustrating a location aligned with an indentation formed in a plate shaped body, in a state viewed from another side in a plate thickness direction.
Figure 7B:
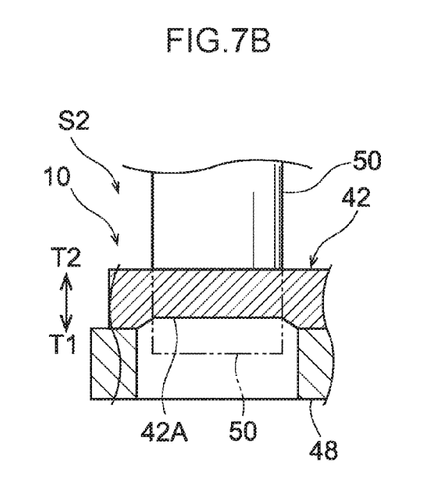
FIG. 7B is a cross-section illustrating a state in which a die is made to contact a face on one side, and a punch is made to contact a face on another side, of a plate shaped body.
Figure 7C:
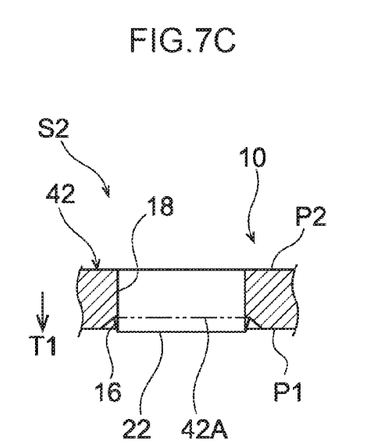
FIG. 7C is a cross-section illustrating a state in which a through-hole has been formed in a plate shaped body by punching using a punch, and a raised portion has been formed at a through-hole peripheral edge at an exit side of the punching.

Next, the punching process S2 in FIG. 7A to FIG. 7C is a process in which a location aligned within a range of each indentation 42A is punched from the other side in the plate thickness direction using a press to form the respective through-hole 18. Specifically, a die 48 is disposed on the one side in the plate thickness direction of the core metal 10, namely, the indentation 42A side, and a punch 50 is disposed on the other side thereof. The outer diameter of the punch 50 corresponds to the diameter of a bottom face of the indentation 42A, for example. Thus, the punch 50 can be easily disposed at a location superimposed on the indentation 42A in the plate thickness direction and aligned within the range of the respective indentation 42A.

As illustrated as an example in FIG. 7C, when the punch 50 is pressed toward the one side, namely, the arrow T1 direction, to punch the plate shaped body 42, the through-hole 18 is formed within the range of the indentation 42A of the core metal 10. When this is performed, a through-hole peripheral edge at an exit side of the punching is positioned within the range of the indentation 42A. Since punching is performed within the range of the indentation 42A, an outer peripheral portion of the indentation 42A remains as the cutout portion 16 after punching. Thus, even though the raised portion 22 is formed at the through-hole peripheral edge, the raised portion 22 is formed in the indentation 42A, and so is suppressed from projecting out from the face on the one side in the plate thickness direction, namely, the moving link side face P1. Thus, chamfering to remove the raised portions 22 formed at the respective through-hole peripheral edges is rendered unnecessary, enabling the number of processes and the cost to be reduced.

As illustrated in FIG. 7C as an example, in cases in which the raised portion 22 is formed projecting out from the face on the one side, namely, the moving link side face P1, the raised portion 22 can be reduced in the subsequent blasting process S3. In cases in which the raised portion 22 does not project out from the moving link side face P1, the blasting process S3 does not necessarily have to be performed.

Figure 7D:
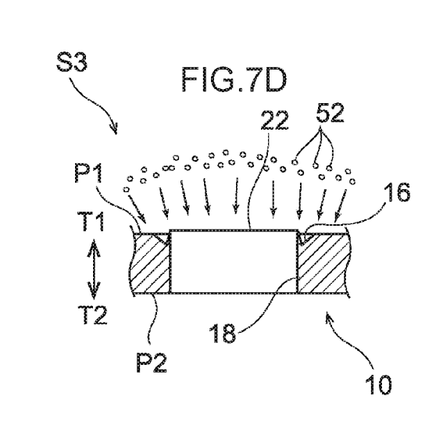
FIG. 7D is a cross-section illustrating blasting against a face on one side of a plate shaped body.
Figure 7E:
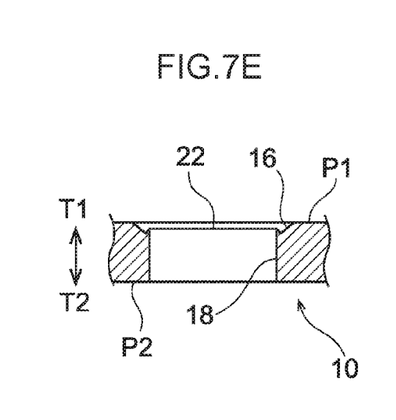
FIG. 7E is a cross-section illustrating a state in which, as a result of blasting, a raised portion at a through-hole peripheral edge has been reduced to an amount that does not project out from a face on one side.

The blasting process S3 is a process in which the height of each raised portion 22 is reduced by blasting such that the raised portion 22 formed on the respective through-hole peripheral edge in the punching process S2 does not project out from the moving link side face P1. Specifically, as illustrated in FIG. 7D, a large amount of projectile material 52 is made to collide with the face on the one side in the plate thickness direction of the core metal 10, namely, the moving link side face P1, so as to reduce the height of the raised portion 22. As illustrated in FIG. 7E as an example, this enables each raised portion 22 to be further suppressed from projecting out toward the one side in the plate thickness direction, and also enables non-illustrated scale and so on, which has adhered to the moving link side face P1 in the previous processes, to be removed. The blasting process S3 is an example of a surface treatment process. Since the height of the each raised portion 22 can be reduced accompanying the surface treatment, there is no need to perform an additional process, such as chamfering, in order to remove the raised portion 22. Note that various types of blasting, such as shot blasting or sand blasting, may be performed as the blasting process. Various types of treatment, such as polishing or etching, which are capable of reducing the height of the raised portion 22, may be performed as the surface treatment.

Other Exemplary Embodiments

An example of the technology of the present disclosure has been explained above: however, the technology of the present disclosure is not limited to that described above, and obviously various other modifications may be implemented within a range not departing from the spirit of the present disclosure.

The rubber 38 has been given as an example of a resilient body provided at the resilient crawler track shoe 20; however, a resilient body other than the rubber 38 may be employed.

What is claimed is:

1. A crawler track shoe core metal that is formed in a plate shape, and that is clamped and fixed by a fixing member to a moving link provided at a travelling body, the crawler track shoe core metal comprising:
    a cutout portion that is formed indented in a face on a moving link side;
    a through-hole that pierces through inside the cutout portion in a plate thickness direction for receiving the fixing member; and
    a raised portion that projects out from a through-hole peripheral edge of the cutout portion toward the moving link side, the raised portion having a projecting end with a height that does not reach the face on the moving link side.

2. The crawler track shoe core metal of claim 1, wherein a surface roughness of a face on a fixing member side is lower than a surface roughness of the face on the moving link side.

3. A resilient crawler track shoe comprising the crawler track shoe core metal of claim 1 having a face on a fixing member side covered by a resilient body.

* * * * *